Figure 1:
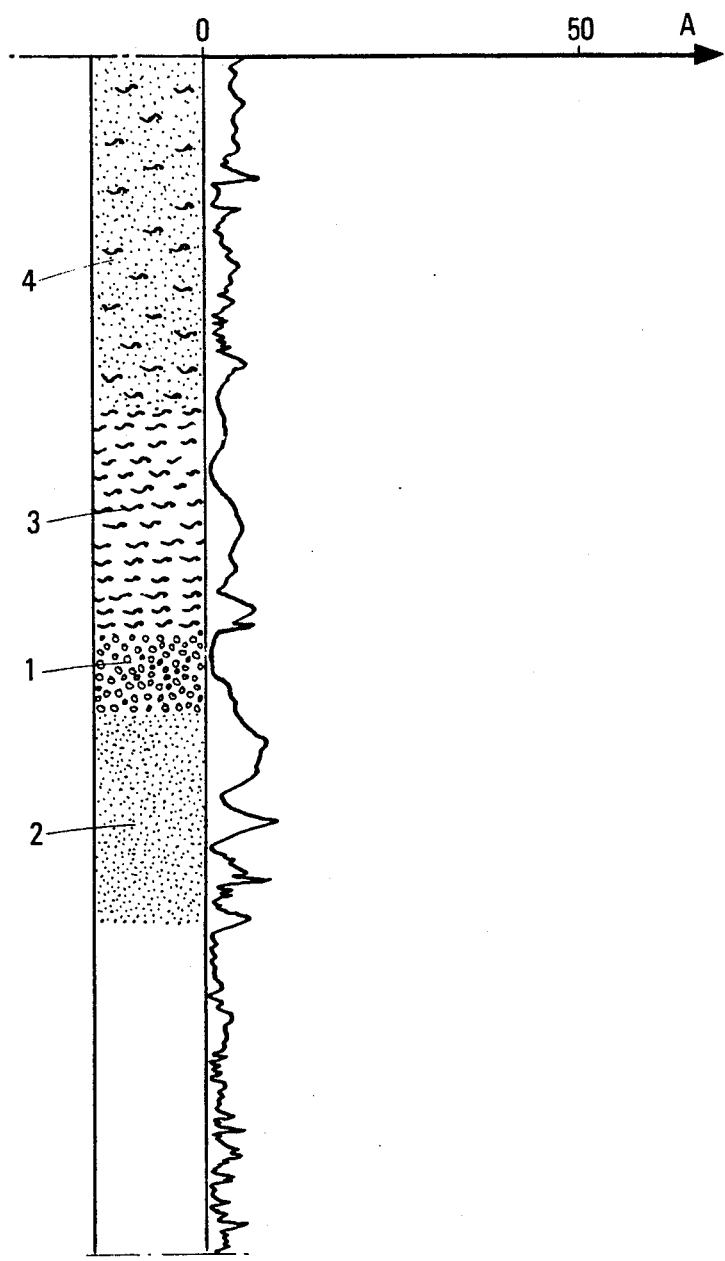

United States Patent [19]

Marrast et al.

[11] 3,926,257

[45] Dec. 16, 1975

[54] WELL CEMENTING PROCESSES

[75] Inventors: Jacques Marrast, Marly-le-Roi; Louis Minssieux, Rueil-Malmaison; Eric Blondin, Montesson, all of France

[73] Assignees: Gaz de France; Institut Francais du Petrole, both of France

[22] Filed: May 14, 1974

[21] Appl. No.: 469,822

[30] Foreign Application Priority Data

May 18, 1973  France .............................. 73.18124

[52] U.S. Cl. .................... 166/293; 106/90; 166/309
[51] Int. Cl.² ..................... E21B 33/13; E21B 43/00
[58] Field of Search ............................... 106/88, 90; 166/292–294, 285, 300, 309, DIG. 1; 61/.5

[56] References Cited
UNITED STATES PATENTS

| | | | |
|---|---|---|---|
| 2,796,131 | 6/1957 | Hinchliffe .............................. | 106/90 |
| 2,798,003 | 7/1957 | Morgan et al. ........................ | 106/90 |
| 2,800,963 | 7/1957 | Roberts et al. ........................ | 106/90 |
| 3,242,986 | 3/1966 | Hower .................... | 166/293 |
| 3,272,765 | 9/1966 | Sefton .................. | 106/90 |
| 3,299,953 | 1/1967 | Bernard ...................... | 166/285 |
| 3,393,738 | 7/1968 | Bernard et al. ...................... | 166/292 |
| 3,394,758 | 7/1968 | Terry et al. .......................... | 166/292 |
| 3,464,491 | 9/1969 | Froning.............................. | 166/294 |
| 3,616,858 | 11/1971 | Raza ................... | 166/294 |

OTHER PUBLICATIONS

Bernard et al., "Effect of Foam on Permeability of Porous Media to Gas," SPE Journal, Sept., 1964, pp. 267–274.

*Primary Examiner*—Frank L. Abbott
*Assistant Examiner*—Jack E. Ebel
*Attorney, Agent, or Firm*—Craig & Antonelli

[57] ABSTRACT

A cementing process wherein a foaming agent is added to the cement slurry prior to injecting the latter into a well.

This foaming agent cooperates with the gas which escapes from a gas-containing formation to form a foam barrier which prevents any subsequent migration of gas during the setting of the cement.

26 Claims, 2 Drawing Figures

WELL CEMENTING PROCESSES

The present invention relates to an improvement in the processes for cementing wells which penetrate gas-containing geological formations, this improvement providing a tight cementing of the wells, which prevents gas diffusion through the cement or along the contact surface between a well casing and the wall of the well.

Cementing well casings in producing wells and in wells drilled for exploiting underground gas-storage facilities is generally defective at or above the level of gas-containing underground strata, since the gas diffuses through the cement and flows upwardly along the casing.

This gas flow through the cement results from the fact that the cement slurry, after a setting period of a few hours, no longer maintains a hydrostatic pressure on the gas reservoir, so that gas can diffuse or flow between cement grains, thereby displacing the water which is not yet fixed and creating channels through the cement so that the latter becomes porous and is not gas tight.

It has previously been proposed to inject into the annular space between the well casing and the wall of the well, before cementing this annular space, a foaming solution diffusing through the ground in the vicinity of the wall of the well wherein it creates, after an auxiliary gas has been injected from the ground surface, a foam barrier capable of restraining gas diffusion from the geological formation to the wall of the well.

This process does not seem to solve satisfactorily the above mentioned problem and, moreover, requires a special operation for producing foam in the well.

As a matter of fact, according to such prior art processes, the foam must either be produced at the ground surface and subsequently injected into the well, by using an aqueous solution which contains a foaming agent and wherein a pressurized auxiliary gas is injected, or, alternatively, must be formed in situ by successively injecting the aqueous solution containing the foaming agent into the annular space between the well casing and the wall of the well, and then displacing this solution by a pressurized auxiliary gas which causes the formation of foam in the ground in the vicinity of the wall of the well.

The invention provides an improved well cementing process avoiding the drawbacks of prior art techniques.

The process according to the invention differs from prior art processes directed to the formation of a foam barrier in the ground in the vicinity of a well by the incorporation to the cement slurry itself of a foaming agent, which does not prevent the setting of said cement slurry and which changes neither the time required for pumping this cement slurry into the well nor the mechanical characteristics of the so-constituted cement, resulting in the formation of foam within the pores of the cement during the setting thereof as gas tends to diffuse or flow through this cement, before complete setting thereof.

The presence of foam within the pores results in a strong reduction of the gas permeability, by creating a foam barrier which is much more efficient than that obtained by the prior art method.

The setting time of the cement, may advantageously be reduced by incorporating to the cement slurry a compound for accelerating the cement setting, which may be of a known type.

Perfectly gas-tight cementation have been obtained using as foaming agents a mixture containing at least one ionic foaming surfactant and at least one non-ionic surfactant in solution.

A gas-tight cementing of a well can be achieved, according to the invention, at the level and above the gas-containing layer, over a sufficient height of the well, so that a gas-tight ring of sufficient height, prevents the gas from flowing along the well through the annular cemented space comprised between the wall of this well and the well casing.

The ionic surfactants may be anionic or cationic.

By way of example, an anionic surfactant which can be used in admixture with a non-ionic surfactant for constituting the foaming agent incorporated to the cement may be selected from the non-limitative following list:
sulfates of fatty alcohols,
sulfates of polyethoxy fatty alcohols,
sulfates of ethoxy alkylphenols,
phosphoric esters of ethoxy fatty alcohols.

The cationic surfactant may be a quaternary ammonium salt.

The non-ionic surfactant in solution, to be used in admixture with one or more of the above indicated compounds, may be selected from the following groups of non-ionic surfactants:
ethoxy alkylphenols
ethoxy fatty alcohols
condensation products of ethylene oxide and glycol-propylenes
esters of ethoxy sorbitol.

The mixture of the selected surfactants must not precipitate under the action of the ions contained in the cement slurry and in the filtrate of the mud used for drilling the well.

Very good results have been obtained with foaming agents constituted by at least one oxyethylene aliphatic compound and at least one sulfate of polyethoxy fatty alcohol.

The concentration by weight of foaming agent in the aqueous phase of the cement slurry will generally be from 0.1 to 5 % and excellent results have been obtained with concentrations of from 0.5 to 2 %.

The use of the foaming compounds on the field will require some care, since when the foaming agent has been put into the solution, any violent agitation in the presence of air must be avoided in order not to reduce the density of the cement slurry by including air bubbles therein.

For this purpose the foaming agent will preferably be injected with the help of a proportioning pump into the already prepared cement slurry, i.e. this injection will be performed after the cement (supplied by a cement hopper) has been mixed with water.

Several field tests have been carried out according to the above-indicated conditions. The concentration in foaming agent was 1 %.

A logging for determining the adherence of the cement according to the invention FIG. 1 permits an evaluation of the quality of the cementing, particularly at the level of the gas impregnated layer. The logging of a conventional primary cementing of a well penetrating the same ground layer is also shown for comparison (FIG. 2).

The adjoining wells drilled through the same geological formation, which were subjected to the tests, traversed a gas impregnated layer 1 located above an aqueous layer 2 and having a clayish caprock 3 which was itself covered by permeable clayish sands 4.

The logging was carried out using a sonde emitting acoustic waves whose absorption is increased as the adherence is greater.

Figure 2:
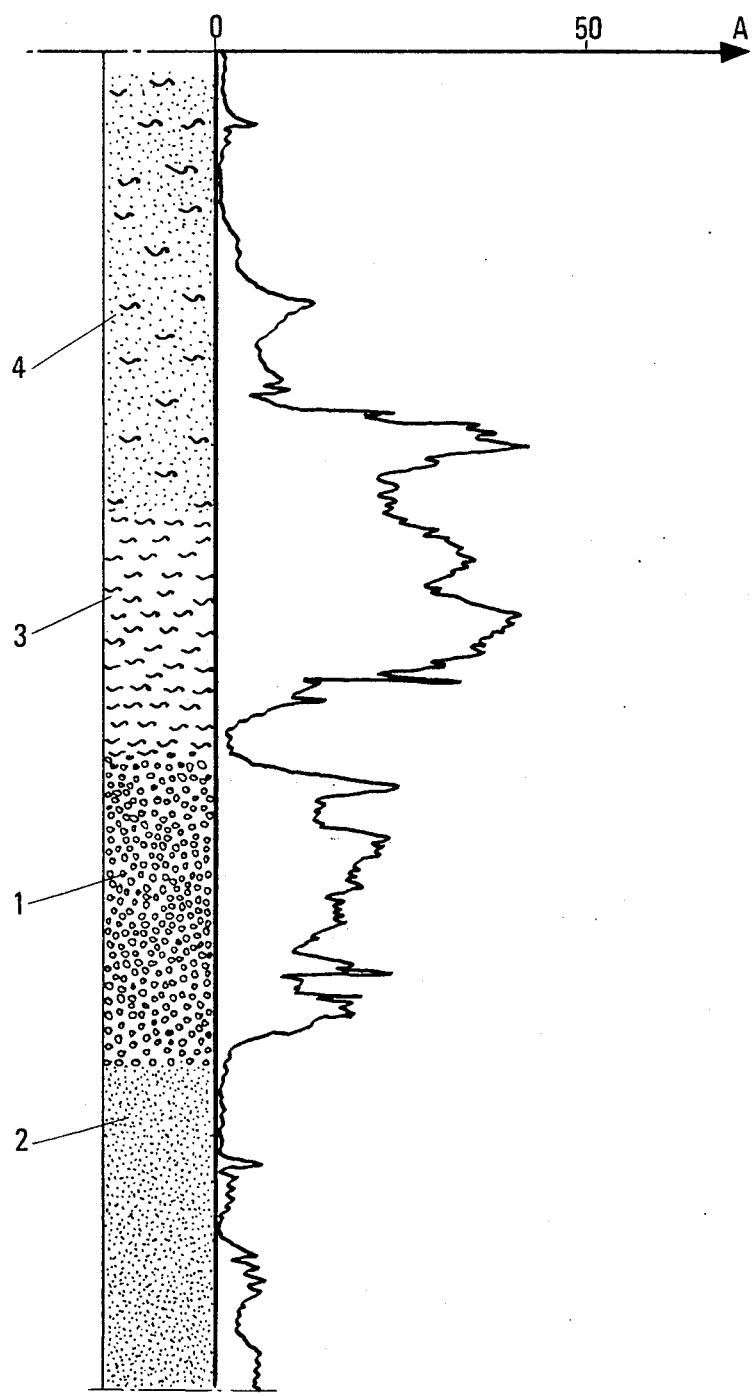

In the recordings of FIGS. 1 and 2 the amplitude A is in millivolts of the signal picked up by the sonde receiver at the different levels of the well.

In the logging of FIG. 2, this amplitude is high at the levels of the gas layer 1, of the clayish caprock 3 and of the bottom of the layer 4 of clayish sands, which indicates a gas diffusion through the cement.

On the contrary, when using the process according to the invention, a gas tight cementing is obtained, as indicated by the low signal amplitude recorded at the levels of the above-indicated layers.

This low amplitude corresponds to a high absorption of the acoustic energy all along this cemented section of the well, which shows the good adherence of the cement, and, consequently, its tightness with respect to gas.

We claim:

1. In a process for cementing a casing in a well traversing at least one gas-containing formation in which cement is placed in the annulus formed between the wellbore and the casing, the improvement wherein cementing is effected by injecting a cement slurry containing a foaming agent which by cooperating with the gas of the formation produces a foam barrier which prevents any subsequent migration of gas through the cement slurry during the setting of the cement slurry.

2. A cementing process according to claim 1, wherein a compound for accelerating the cement setting is incorporated to the cement slurry.

3. A cementing process according to claim 1, wherein the foaming agent consists of a monophasic aqueous solution containing at least one ionic surfactant and at least one non-ionic surfactant.

4. A cementing process according to claim 3, wherein the ionic surfactant is anionic.

5. A cementing porcess according to claim 3, wherein the ionic surfactant is cationic.

6. A cementing process according to claim 3, wherein the non-ionic surfactant is selected from the group consisting of ethoxy alkylphenols, ethoxy fatty alcohols, condensation products of ethylene oxide with glycolpropylene and esters of ethoxy sorbitol.

7. A cementing process according to claim 4, wherein the anionic surfactant is selected from the group consisting of sulfates of fatty alcohols, sulfates of polyethoxy fatty alcohols, sulfates of ethoxy alkylphenols and phosphoric esters of ethoxy fatty alcohols.

8. A cementing process according to claim 5, wherein the cationic surfactant is a quaternary ammonium salt.

9. A cementing process according to claim 1 to wherein the cement slurry is prepared by first admixing cement and water and then incorporating said foaming agent into the resulting mixture.

10. A cementing process according to claim 1 to wherein said foaming agent is formed of at least one oxyethylene aliphatic compound and at least one sulfate of polyethoxy fatty alcohol.

11. A cementing process according to claim 1 to wherein the aqueous phase of the cement slurry contains from 0.1 to 5 percent by weight of foaming agent.

12. A cementing process according to claim 11, wherein the aqueous phase of the cement slurry contains from 0.5 to 2 weight percent of foaming agent.

13. A cementing process according to claim 1, wherein cementing is effected by injecting a cement composition consisting essentially of an aqueous cement slurry and a foaming agent.

14. A cementing process according to claim 13, wherein cementing is effected by injecting a cement composition consisting of an aqueous cement slurry and a foaming agent.

15. In a process for cementing a casing in a well traversing at least one gas-containing formation in which cement is placed in the annulus formed between the wellbore and the casing, the improvement comprising injecting into said annulus a cement slurry containing a foaming agent capable of producing in said cement slurry before complete setting thereof a foam barrier if gas from said formation begins to diffuse through said cement slurry said foam barrier being sufficiently stable to prevent migration of gas through said foam barrier during setting of the cement slurry.

16. The process of claim 15, wherein a composition consisting essentially of an aqueous cement slurry and said foaming agent is injected into said annulus.

17. The process of claim 16, wherein a composition consisting of said aqueous cement slurry and said foaming agent is injected into said annulus.

18. In a process for cementing a casing in a well traversing at least one gas-containing formation in which cement is placed in the annulus formed between the wellbore and the casing, the improvement comprising injecting into the annulus a cement slurry containing an organic component consisting essentially of a foaming agent in an amount sufficient to form a foam within the pores of the cement slurry prior to complete setting thereof upon contact of said cement slurry with gas from said formation, said foam being sufficiently stable to form a foam barrier materially reducing the gas permeability of said cement.

19. The process of claim 18, wherein said organic component consists of said foaming agent.

20. The process of claim 18, wherein said foaming agent is composed of a mixture of at least one ionic surfactant and at least one non-ionic surfactant.

21. The process of claim 20, wherein said ionic surfactant is selected from the group consisting of sulfates of fatty alcohols, sulfates of polyethoxy fatty alcohols, sulfates of ethoxy alkylphenols, phosphoric esters of ethoxy fatty alcohols and quaternary ammonium salts.

22. The process of claim 21, wherein said non-ionic surfactant is selected from the group consisting of ethoxy alkylphenols, ethoxy fatty alcohols, condensation products of ethylene oxide and glycolpropylenes and esters of ethoxy sorbitol.

23. The process of claim 20, wherein said non-ionic surfactant is selected from the group consisting of ethoxy alkylphenols, ethoxy fatty alcohols, condensation products of ethylene oxide and glycolpropylenes and esters of ethoxy sorbitol.

24. The process of claim 20, wherein said foaming agent comprises at least one oxyethylene aliphatic compound and at least one sulfate of polyethoxy fatty alcohol.

25. The process of claim 18, wherein said cement slurry contains 0.1 to 5 weight percent of said foaming agent based on the weight of the aqueous phase of said slurry.

26. The process of claim 25, wherein said cement slurry contains 0.5 to 2 weight percent of said foaming agent based on the weight of the aqueous phase of said slurry.

* * * * *